Dec. 25, 1956
M. D. ISSERLIS
2,775,371
ROTATING BIN FEEDER
Filed Oct. 6, 1951
2 Sheets-Sheet 1
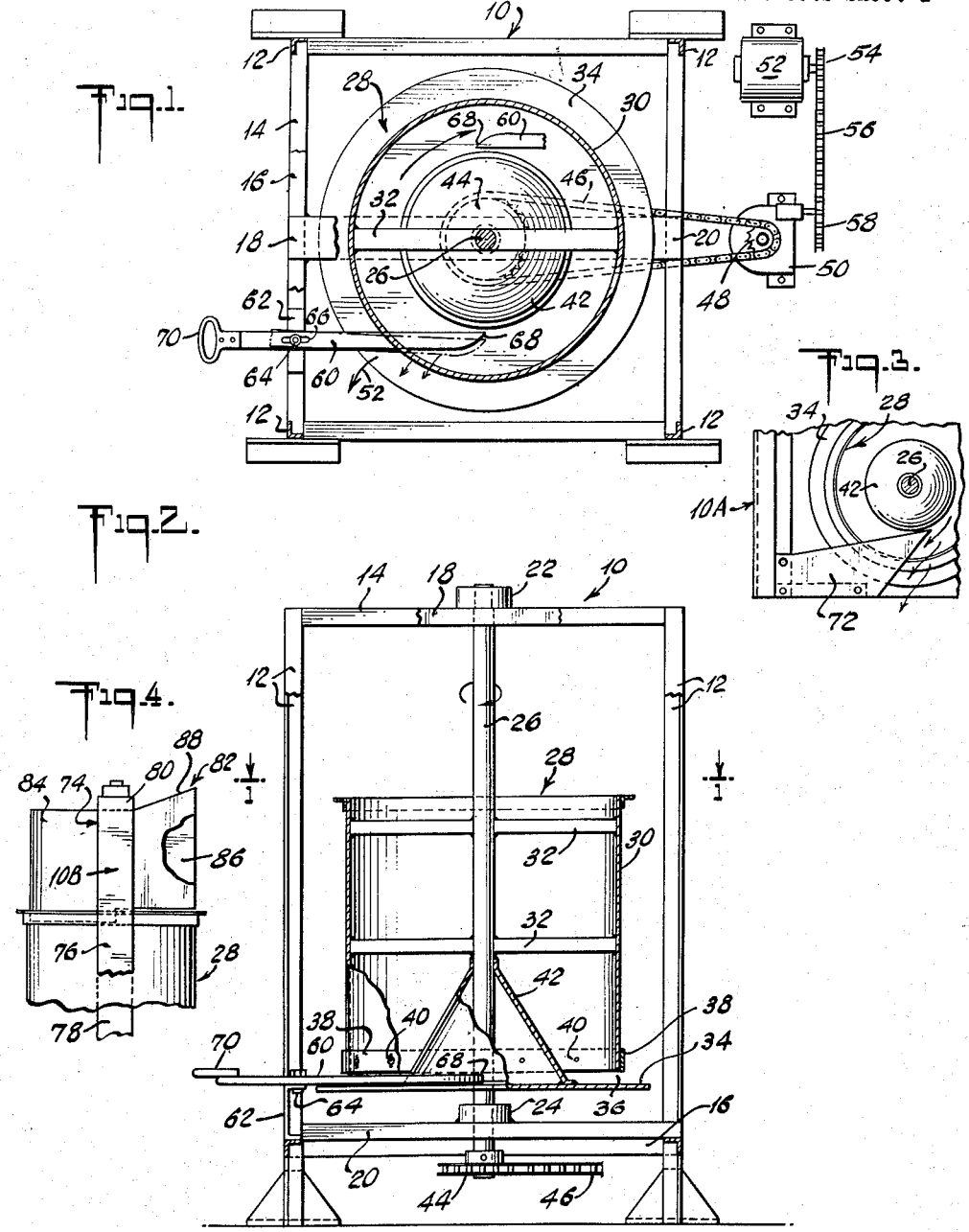
INVENTOR.
Morris D. Isserlis Dec. 25, 1956  M. D. ISSERLIS  2,775,371
ROTATING BIN FEEDER
Filed Oct. 6, 1951  2 Sheets-Sheet 2

INVENTOR
Morris D. Isserlis

United States Patent Office 2,775,371
Patented Dec. 25, 1956

2,775,371

ROTATING BIN FEEDER

Morris D. Isserlis, New Brunswick, N. J.

Application October 6, 1951, Serial No. 250,150

8 Claims. (Cl. 222—168)

This invention relates to a rotating bin feeding device whose function is to store and feed material uniformly at a predetermined rate. This device will feed any sticky material, or lumpy material which cannot now be handled automatically. These materials may be for example filter cake, crystalline materials—damp or dry, fine powders, such as clay, pigments, talc, etc. Free flowing materials, of course, can be handled well.

In operation, the materials are deposited into the upper end of a rotating cylinder, or bin feeder which may be open or sealed to prevent dusting or reaction with the atmosphere.

The bin feeder or rotating cylinder is comprised mainly of three parts, an open ended cylinder, a disc like receiving platform, or distributing plate, and a cone structure mounted on and located centrally with respect to said plate, all parts being affixed to and rotating with a central vertical drive shaft. The rotating platform on which the mass of material rests, is spaced from the lower end of said cylinder to provide an annular discharge opening, and which can be adjusted to vary the rate of discharge, and the cone structure is adapted to urge the material during its descent in the bin, when in operation, toward the annular discharge opening in an even flowing manner.

Another object is to provide a means for feeding at several points at once, by having several discharge plows or scrapers at desired points.

Yet another object is to discharge the material at various thicknesses or shapes, by varying the type of discharge opening, shape of discharge blade, and annular clearances. For instance, if it were desired to dry filter cake in a continuous dryer, it would be desirable to extrude the feed in a very thin film.

Still another object is to provide a means of feeding from a large stationary bin, where the discharge opening may be left very large so that the stickiest material will flow to my smaller rotating bin feeder.

Another object is to be able to feed lumpy material by having the discharge plow cut and shear these lumps. In this respect this device acts as a type of mill.

Another object is to be able to feed material having large pieces of foreign matter, such as stones or bricks, by the expedient of leaving a large enough annular clearance between the rotating plate and the rotating cylinder. With a very large clearance, the overlap on the horizontal plate must be large enough to prevent the material from flowing over it. This depends on the angle of repose of the material. The rate of feed is then determined by the thickness of the discharge plow, the extent to which it protrudes into the cylinder, and the speed of rotation.

Yet another object is to provide a positive means for moving all the material at the bottom of the mass, toward the discharge opening, thus ensuring constant replacement by new material.

Another object is to provide an apparatus of simplified construction, which requires very few machined parts, but which performs efficiently, at very low power requirements, and as a result of its simplicity may be constructed at a minimum cost.

Other objects and advantages may be clearly seen and understood by reference to the accompanying drawings in which:

Figure 1 is a top view of the rotating bin feeder in the instant invention, parts being broken away and in section;

Figure 2 is a side view of Fig. 1 with parts being broken away and in section;

Figure 3 is a fragmental top view of a modified form of scraper;

Figure 4 is a side view of the top portion of the material bin of Fig. 2, in which the upper open end of the bin is susbtantially sealed;

Figure 6:
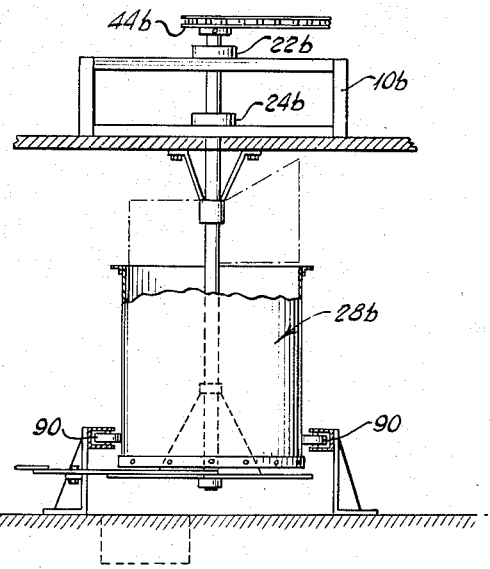
Figure 6 is a diagrammatic view similar to Fig. 5 showing still another modified form of construction.

Referring now to the drawings, a supporting frame generally indicated at 10, and comprising four upright angle members 12, held in spaced relation at their upper ends by angle iron cross members secured thereto in any suitable manner, such as by welding, and forming a rectangular frame 14, the uprights 12 are similarly held near their lower ends by a rectangular frame 16. The upright members 12 have affixed to their lower ends in any suitable manner, angular gusset plates, forming feet, whereby the frame structure 10 may be securely fastened to the floor.

Two centrally located channel support members 18 and 20, respectively, are mounted on said rectangular frame members 14 and 16 respectively and secured thereto by welding, completing the frame structure, said members 18 and 20 having combination radial and thrust bearings 22 and 24, respectively, mounted thereon to support a vertical shaft 26 for rotation therein, said shaft 26, adapted to have mounted thereon a proportionately large feeder bin shown generally at 28 in the form of an open ended cylinder 30, said cylinder 30 being affixed to said shaft 26 and concentric therewith and held in spaced relation by horizontal braces 32.

A circular receiving plate or platform 34 is located adjacent the lower end of the cylindrical member 30, said platform 34, having a diameter substantially greater than the cylinder 30 and spaced vertically therefrom as shown at 36 in Fig. 2 to permit egress of the material to be moved. The space 36 may be increased or decreased depending on the composition of the material being moved, the tackiness or viscosity of such material plus the required rate of discharge being the determining factor in the adjustment of said opening 36. Said adjustment is accomplished by raising or lowering a circumferential slidable adjustment band 38, which has a three-fold purpose, to vary the feed, to allow passage of foreign matter, and shape the discharge, said band 38 having a multiplicity of vertical slots through which screws 40 serve to hold the band 38, to the lower end of the bin or cylinder 30, and in spaced relation to the platform 34.

Mounted to the upper surface of said platform 34, and concentrically secured thereto is a hollow distributing cone 42, said cone 42 being apertured at its upper end to permit the vertical shaft member 26 to pass therethrough. The shaft 26 has affixed to its lowermost end a chain sprocket 44, driven by chain 46, from sprocket 48, and gear reduction box 50, which in turn derives its source of power from a variable speed motor 52, through sprocket 54, chain 56 and sprocket 58 respectively.

By reference to the drawings it will be apparent the elements 26, 27, 34 and 42 being integral, combine to form a bin structure, designed to rotate freely in bearings, 22 and 24, at a speed most suitable to the material to be moved. By way of example but not to be construed in a limiting sense, it has been found satisfactory to use a bin having an effective volume of 120 cubic foot driven through means aforementioned, at speeds of 1 to 5

R. P. M. depending on the form of material to be moved, which may take various forms of residue such as mastic like filter cake, crystalline material—damp or dry, fine powder such as clay, pigments, talc, etc., all of which are sticky or viscous. The material is received in the upper end of the rotating bin 28, and discharged at its lower end through the annular discharge opening 36, during operation of the machine the force imparted to the lower strata of the material due to the weight of the mass above it will direct the flow of such material toward the annular aperture 36, and is aided in its descent by the cone shaped structure 42, at the bottom of the bin, and which is adapted to distribute the material outwardly during its egress, in an even flowing manner over the projecting portion of the platform 34, thus ensuring a more even rate of discharge.

As a sticky material is removed by the plow 60, hereinafter to be described, it will allow the material to be pulled from the top thus causing the material to flow constantly into the void left behind the plow or plows 60 as the mass rotates and thus preventing the material caking to the side of the rotating bin 28. A non-sticky material will flow by gravity.

The hollow distributing cone 42 has multiple functions, serving as a reinforcing member for the circular plate 34, and as a distributing means for the descending material. It has been found by experimentation that without the cone, and with sticky materials the discharge plow 60 must extend to or near the axis of the cylinder to remove the entire bottom layer equal to the plow thickness. This removal is necessary to ensure the downward progress of the material as previously described. As shown herein the plow 60 extends inwardly substantially only to the cone base, which permits a reduction in power requirements, and wear on the mechanism, by way of example, in a machine feeding approximately one ton of material per hour of damp sticky crystalline material. The H. P. required is 1/10 in a 120 cubic foot volume machine.

The material may be discharged to dryers (not shown) but indicated by the arrow 52 (see Fig. 1) at one or more points around the periphery of the bin 28, depending upon the number of plows used.

A discharge plow 60 is provided to direct the flow of material to the dryer, as illustrated. The plow 60 is adjustably mounted on a portion of the frame 62, and is held in its adjusted position by a pivot bolt 64. A slot 66 in the blade of the plow 60, permits the plow to be pivotally rotated inwardly to compensate for wear on the blade tip 68. The plow 60 may be adjusted toward or away from the periphery of the platform 34, to increase or decrease the scraping area thus varying the feed discharge. A handle grip 70 is provided at the operator's end of scraper 54 to facilitate these adjustments. It will thus be seen that the plow may be adjusted, or its thickness increased to shape the discharge of the material for easy disposal to the dryer.

Referring to Fig. 3 which illustrates a modified form of scraper blade 72, it will be seen that the blade is wedge-shaped and has one of its sides tangent to the cone base and protruding past the center line of the cone, which allows for wear on the blade tip without any effective loss of scraping area. The blade 72 is affixed in any suitable way to the frame member 10A.

Fig. 4 shows a modified form of structure wherein the frame structure 10B comprises an inverted U-shaped frame member 74, having uprights 76 and 78 respectively joined at their upper ends by a cross member 80 which supports a hood 82 having one portion 84 of semi-circular cross-section adapted to have its lower end nest inside the top of the rotating bin 30, but spaced therefrom, said hood 82 having its other portion forming an open mouth 86 and of rectangular cross-section with its top portion 88 flared upwardly. This hood or shield permits easy access to the open cylindrical bin 30.

Figure 5:
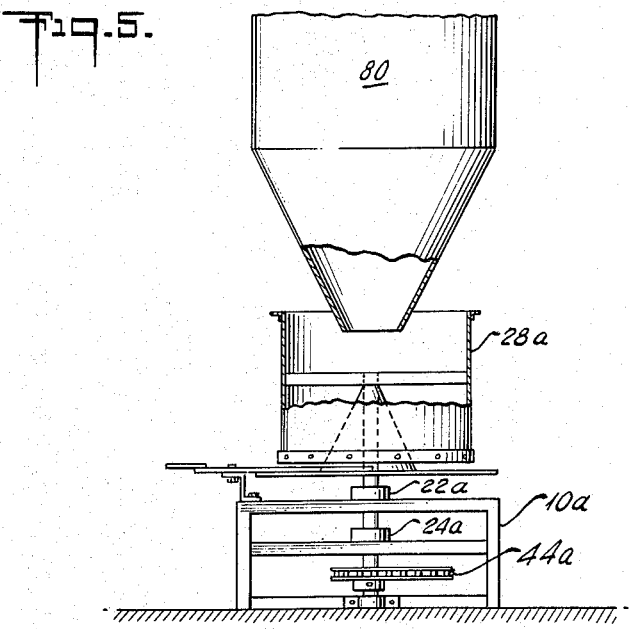
Figure 5 is a diagrammatic view of a further embodiment of my invention.

Referring now to Figure 5, which shows a modified form of the invention, in which the rotating feeder bin 28ª is located above its frame, bearings and drive members 10ª, 22ª, 24ª and 44ª, respectively, thus giving a clear unobstructed opening at the upper end of the bin 28ª for feeding from a large non-rotating storage bin 80.

In Fig. 6 a material bin 28ᵇ is shown suspended from an overhead structure 10ᵇ and having its bearing supports and drive members 22ᵇ, 24ᵇ and 44ᵇ respectively, located on an upper floor, rollers 90 may be provided at spaced intervals around the periphery of the bin 28ᵇ to prevent undue vibration during rotation of the bin.

From the foregoing description it should be apparent that the present invention provides a material bin capable of achieving the several objects set forth in the introductory portion of the specification.

It is, of course, understood that the foregoing description is illustrative only, and that numerous changes can be made therein without departing from the spirit of the invention as defined by the appended claims.

What is claimed is:

1. A rotating bin feeder, comprising a rigid frame structure, supporting and having journaled therein a vertical shaft, said shaft adapted to rotate a concentric bin structure at varying speeds, means for driving said shaft, said bin structure comprising a shell having a cylindrical lower portion, a receiving plate for a mass of material mounted upon said shell in spaced relationship below the lower end thereof to define an annular discharge opening substantially all around said plate, and having mounted thereon a means at an angle to the vertical and also to the horizontal adapted to urge the material during operation of said bin toward said annular discharge opening, said plate having at least one plow adjacent to its upper surface and in sliding contact therewith, said plow having its operating end, located intermediate the said shaft, and the peripheral edge of said plate and adapted for operation nearer to said shaft than to said edge.

2. A rotating bin feeder, as claimed in claim 1, in combination with a centrally located supply bin, positioned above said bin feeder, and in which said supporting frame members are positioned below said rotating bin feeder.

3. A rotating bin feeder, as claimed in claim 1, in which a hood structure is located at the upper end of the cylindrical shell, and fixed to the frame structure, providing an opening at one side for guiding the deposited material into said cylindrical shell.

4. A rotating bin feeder, as claimed in claim 1, in which the rotating bin feeder structure is suspended and supported by the frame members, said frame members being supported above and in spaced relation to the upper open end of the substantially cylindrical shell member to permit the infeed of material.

5. A rotating bin feeder comprising a frame, a shaft journaled in said frame for rotation about a vertical axis, means for rotating said shaft, a horizontal generally circular receiving plate secured to said shaft for rotation therewith, a shell having a cylindrical lower portion concentrically disposed about said shaft with its lower edge spaced above said receiving plate to define an annular discharge opening, means securing said shell to said shaft for rotation therewith, a cone structure fixedly secured to said plate and projecting upwardly therefrom into the interior of said cylindrical lower portion of said shell to urge material therein toward said annular discharge opening, a plow mounted upon said frame and extending through said annular discharge opening, said plow having an operating portion in sliding contact with the upper surface of said receiving plate, and means for adjustably positioning the operating portion of said plow with respect to the juncture of said cone and said plate.

6. A rotating bin feeder comprising a frame, a shaft journaled in said frame for rotation about a vertical axis, means for rotating said shaft, a horizontal generally circular receiving plate secured to said shaft for rotation therewith, a shell having a cylindrical lower portion concentrically disposed about said shaft with its lower edge spaced above said receiving plate, an annular band mounted upon said cylindrical lower portion of said shell adjacent the lower edge thereof, said annular band having a lower edge spaced above said receiving plate to define an annular discharge opening, means for vertically adjusting said annular band with respect to said shell to vary the size of said annular discharge opening, means securing said shell to said shaft for rotation therewith, a cone structure fixedly secured to said plate and projecting upwardly therefrom into the interior of said lower cylindrical portion of said shell to urge material therein towards said annular discharge opening, and a plow mounted upon said frame and extending through said annular discharge opening, said plow having an operating portion in sliding contact with the upper surface of said receiving plate.

7. A rotating bin feeder as defined in claim 6 including means for adjustably positioning the operating portion of said plow with respect to the juncture of said cone and said plate.

8. A rotating bin feeder, as claimed in claim 6, in which the plow is fixed relatively to the base of said cone.

References Cited in the file of this patent

UNITED STATES PATENTS

| Number | Name | Date |
|---|---|---|
| 354,940 | Sharpneck | Dec. 28, 1886 |
| 425,729 | Bennett | Apr. 15, 1890 |
| 592,774 | Frazier | Nov. 2, 1897 |
| 818,585 | Trump | Apr. 24, 1906 |
| 899,527 | Graham | Sept. 29, 1908 |
| 1,184,074 | Clark | May 23, 1916 |
| 1,582,798 | Stephens | Apr. 27, 1926 |
| 1,962,261 | Speiden | June 12, 1934 |
| 2,016,167 | Carlson | Oct. 1, 1935 |
| 2,100,216 | Hughes | Nov. 23, 1937 |
| 2,329,948 | Shallock | Sept. 21, 1943 |